United States Patent [19]

Mayne et al.

[11] Patent Number: 5,277,407
[45] Date of Patent: Jan. 11, 1994

[54] FRICTION WINCH ASSEMBLY FOR RESTRAINING HEAVY ARTICLES

[75] Inventors: Roger Mayne, Williamsville; Earl C. Lempke, Orchard Park; David W. Phillips, West Seneca; James M. Dziadaszek, Orchard Park, all of N.Y.

[73] Assignee: Ryder Automotive Operations, Inc., Miami, Fla.

[21] Appl. No.: 868,994

[22] Filed: Apr. 15, 1992

[51] Int. Cl.$^5$ ............................................... B66D 3/14
[52] U.S. Cl. ..................... 254/369; 24/68 CD; 410/103
[58] Field of Search ............ 24/68; 410/103, 11, 410/23; 254/369

[56] References Cited
U.S. PATENT DOCUMENTS

| | | | |
|---|---|---|---|
| 1,249,336 | 12/1917 | Cooke . | |
| 1,344,845 | 6/1920 | Anderson . | |
| 3,205,834 | 9/1965 | Terlecky | 410/103 |
| 4,045,002 | 4/1975 | Miller . | |
| 4,168,668 | 9/1979 | Grube . | |
| 4,703,917 | 11/1987 | Tomlinson | 254/369 |
| 4,842,458 | 6/1989 | Carpenter | 410/103 X |
| 4,884,928 | 12/1989 | Nachtigall et al. | 410/103 |
| 4,900,203 | 2/1990 | Pope | 24/68 CD |
| 4,912,813 | 4/1990 | Muller . | |

Primary Examiner—Andrew M. Falik
Attorney, Agent, or Firm—Laff, Whitesel, Conte & Saret

[57] ABSTRACT

A friction winch assembly for securing automobiles or other heavy objects to a transporting vehicle includes a spindle rotatably mounted on the transporting vehicle, a ratchet gear axially mounted on said spindle, and an actuator cap for threaded engagement on said spindle. A chain or other flexible elongated member is connected at one of its ends to the spindle for winding or unwinding thereon, and at its other end to the automobile. To wind the chain and secure the vehicle, the actuator cap is rotated with a tool for longitudinal movement along the spindle toward the ratchet until longitudinal movement is limited by a collar affixed to the spindle. The actuator cap, ratchet and spindle eventually frictionally engage each other sufficiently so that they rotate synchronously with the spindle while the chain is wound, until the chain tension secures the automobile. To release the automobile from the friction winch assembly, the actuator cap is rotated in the reverse direction, with a pawl pivotally mounted on the transporting vehicle engaging the ratchet and precluding its rotation. The torque from the chain maintains engagement between the ratchet and actuator head until the chain is sufficiently unwound, at which time the actuator cap and ratchet disengage.

14 Claims, 2 Drawing Sheets

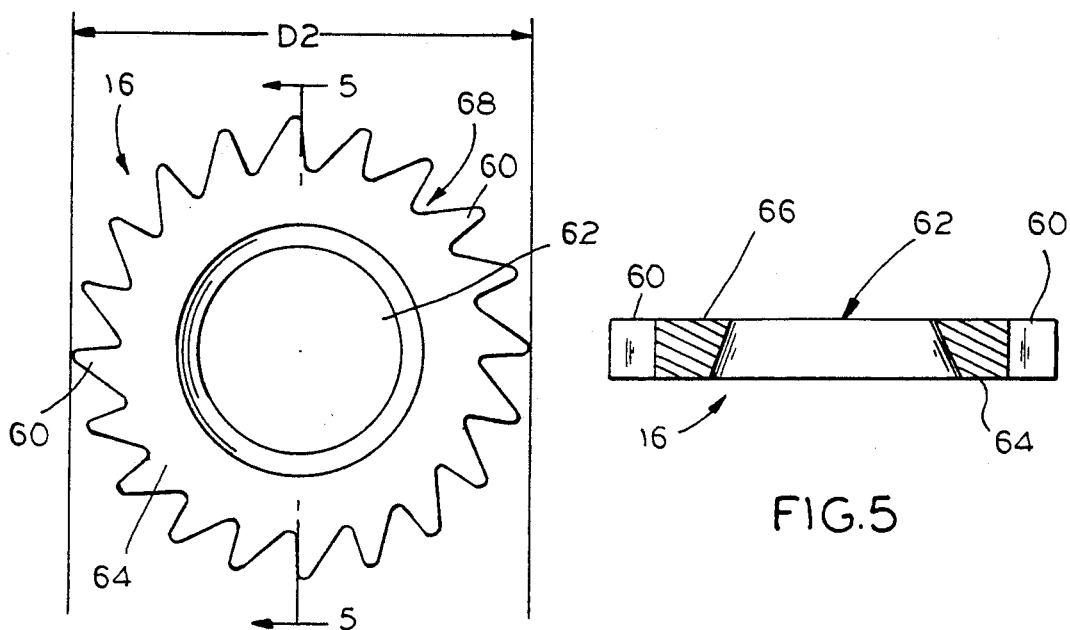
FIG.4
FIG.5
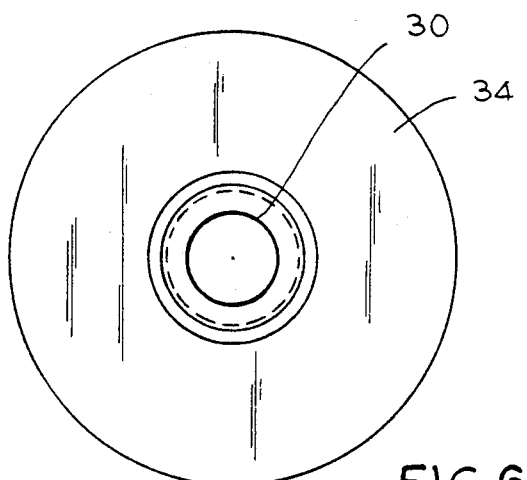
FIG.6
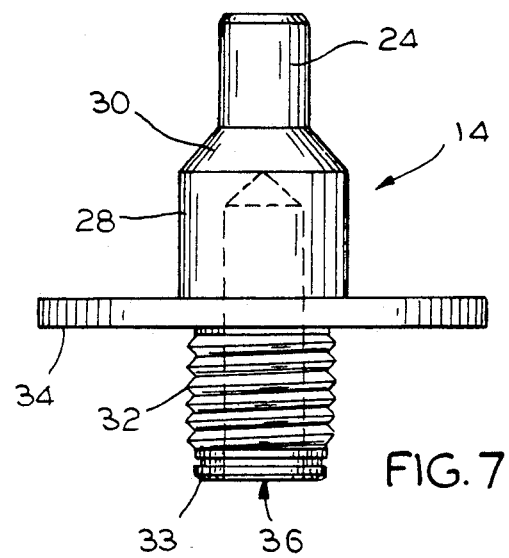
FIG.7
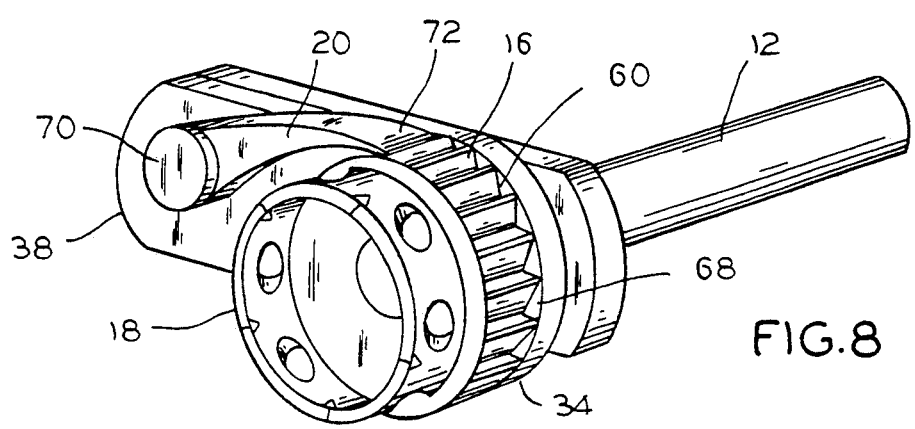
FIG.8

FRICTION WINCH ASSEMBLY FOR RESTRAINING HEAVY ARTICLES

BACKGROUND

This invention relates to devices for restraining, securing, lifting, or pulling heavy objects and, more particularly, to restraining vehicles such as automobiles during their transportation. While automobiles are discussed herein, the invention is useful for tieing down, securing, lifting, or pulling other heavy objects, which may or may not be transported.

Various devices have been used for tieing down and securing automobiles for over the road transportation. For example, automobiles are sometimes chained to a long rotatable spindle mounted on the transporting vehicle. The spindle terminates in a gear and pawl assembly. The pawl locks the gear in the desired position once the gear and spindle have been turned sufficiently to tighten the chain. To loosen the chain in a controlled manner, the pawl has to be regularly disengaged from the gear. This is done by first rotating the gear in the tightening direction sufficiently to clear the pawl from the teeth of the gear, and then rotating the gear in the loosening direction until the pawl again engages the gear, at which time the same steps must be repeated to release the chain. This is a slow, cumbersome procedure requiring two hands and some concentration. Inasmuch as these tiedown devices are sometimes located in difficult-to-reach locations on the transporting vehicle, the operation of the tiedown devices can be very awkward.

SUMMARY OF THE INVENTION

A friction winch assembly for securing automobiles or other heavy objects to a transporting vehicle according to the present invention includes a spindle for rotatable mounting on the transporting vehicle. A strap, chain, or other flexible elongated member is attached at one end to the spindle and at the other end to the automobile to be secured. The spindle has a collar fixed near a threaded one of its ends. A ratchet gear is loosely and rotatably mounted on the threaded end adjacent to the collar. An actuator cap threadedly engages the threaded end of the spindle, with the ratchet gear positioned between the actuator cap and the collar. A pawl pivotally fixed to the transporting vehicle engages the teeth of the ratchet gear. A wrench or other tool is used to tighten the actuator cap against both the ratchet gear and collar. When the actuator cap is sufficiently tightened, the compression applied between the actuator cap and collar to the ratchet gear produces frictional engagement among the cap, gear and collar so that they rotate as a unit simultaneously with the spindle while the chain is wound thereon. Continued winding of the spindle, together with the weight and resistance of the automobile, eventually combine to tension the chain and secure the automobile in place.

To release the automobile, the wrench or other tool is used to rotate the actuator cap in the opposite direction. The pawl remains continuously engaged with the ratchet gear to prevent its rotation in the unwinding direction, while the tightened chain maintains a torque on the spindle and collar and causes the collar to maintain the ratchet in frictional engagement against the actuator cap. Further rotation of the cap in the unwinding direction eventually reduces the tension in the chain so that the collar and gear are no longer urged toward the cap. The cap then disengages from the gear and collar.

If the invention is used for purposes other than securing a heavy object to a transporting vehicle, the spindle can be rotatably mounted on a suitably fixed, rigid bracket or stand.

BRIEF DESCRIPTION OF THE DRAWINGS

The principles of the invention are shown in the attached drawings, in which:

FIG. 4 is a plan view of the ratchet.
FIG. 5 is a cross-sectional view of the ratchet taken along 5—5 of FIG. 5.
FIG. 6 is a plan view of the collar.
FIG. 7 is a perspective view of the first end section.
FIG. 8 is a perspective view of the invention.

DETAILED DESCRIPTION OF THE INVENTION

Figure 1:
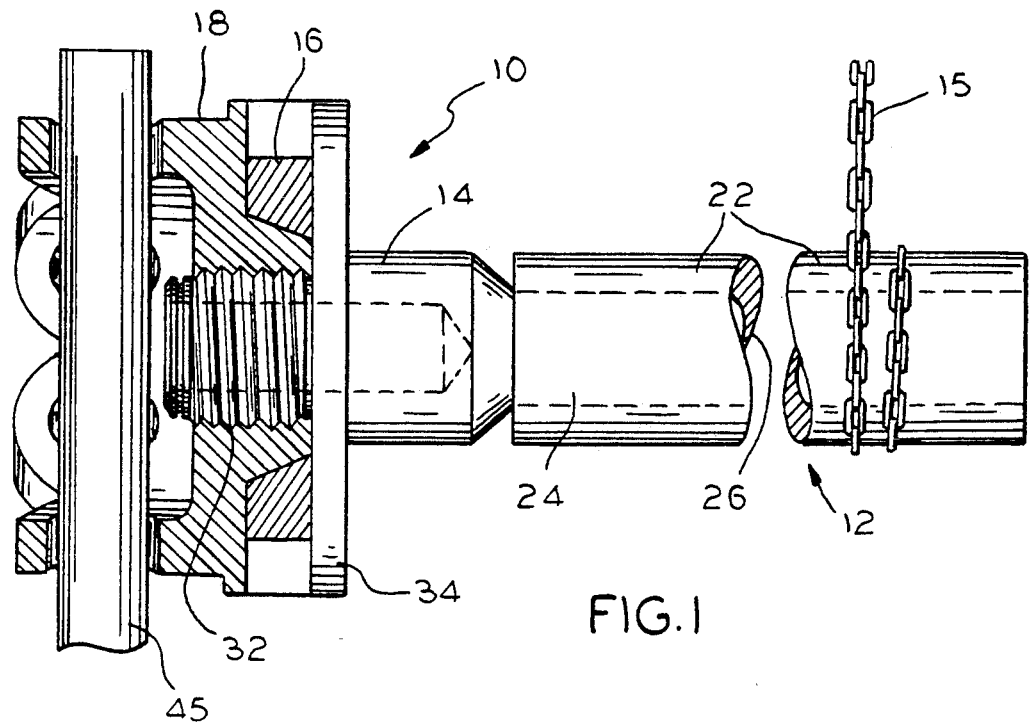
FIG. 1 is a cross-sectional view of the actuator cap, ratchet, and spindle of the invention.

As shown in FIGS. 1 and 8, a friction winch assembly 10 according to the invention includes a spindle 12, first end section 14, a ratchet 16, an actuator cap 18, and a pawl 20.

The spindle or shaft 12 preferably includes a hollow tube section 22 and a first end section 14. First end section 14 includes a male end 24 of suitable diameter to fit within the cavity 26 of hollow tube section 22. First end section 14 further includes a main body portion 28 corresponding in diameter to tube section 22, and a tapered neck section 30 joining male end 24 and main body portion 28. (FIG. 7). First end section 14 has a threaded end 32 opposite male end 24. Preferably, threaded end 32 terminates with a snap ring 33. A collar 34 (FIGS. 1, 6 and 7) extends around first end section 14 between main body portion 28 and threaded end 32. The main body portion is typically formed with a cavity 36 extending through and open at the threaded end 32. When first end section 14 is welded or otherwise permanently attached to tube section 22, the combination forms spindle 12.

The spindle 12 is typically rotatably mounted to the frame of the transporting vehicle (not shown). As shown in FIG. 8, spindle 12 is engaged in mounting bracket 38, which in turn is fastened to the frame of the transporting vehicle. The second end (not shown) of spindle 12 is also mounted to the frame of the transporting vehicle opposite from mounting bracket 38.

Figure 2:
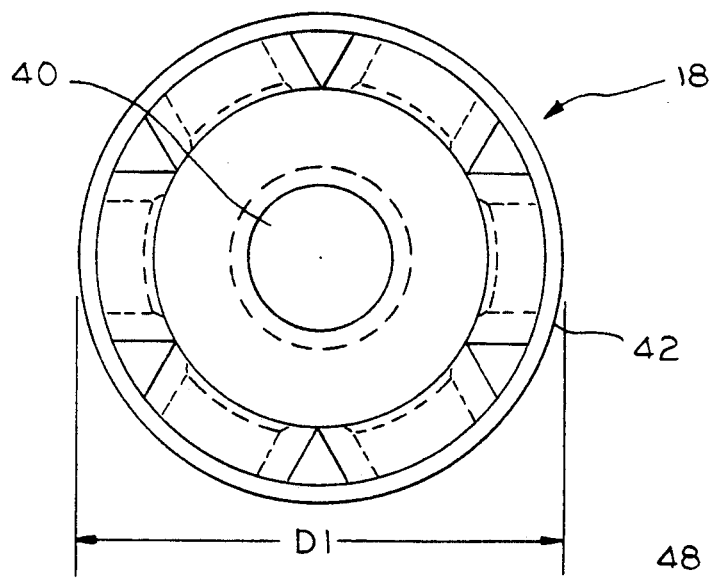
FIG. 2 is a plan view of the actuator cap.
Figure 3:
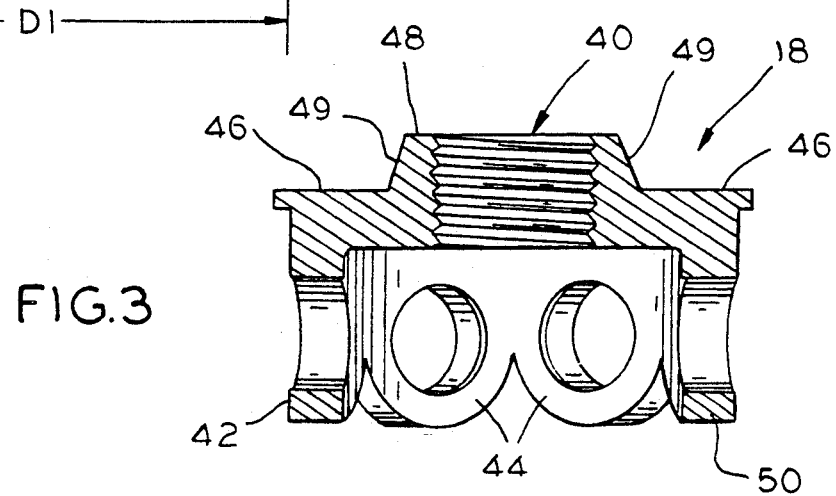
FIG. 3 is a cross-sectional view of the actuator cap.

The actuator cap 18 is shown in detail in FIGS. 2 and 3. The cap 18 includes a threaded passage 40 at the interior end 48 of cap 18 suitable for receiving and engaging threaded end 32 of the spindle 12. Opposite the threaded passage 40 at exterior end 50 of cap 18 is a gearhead 42 including a plurality of apertures 44. The cap has a pair of shoulders 46 recessed along the longitudinal dimension from interior end 48, and a tapered neck portion 49.

The gearhead could have a number of different configurations. For example, instead of apertures 44, the gearhead could be configured like a hex-nut, or with a hexagonal socket. As described subsequently, the gearhead configuration must merely be appropriate for easy engagement with a tool 45 (FIG. 1) capable of exerting force to rotate the actuator cap in either direction along threaded end 32.

The ratchet gear 16 is best shown in FIGS. 4 and 5. Ratchet 16 is generally circular and has a plurality of teeth 60 extending radially around its periphery and a center aperture 62. Center aperture 62 is sufficiently larger in diameter than threaded end 32 of spindle 12 so that when threaded end 32 is placed through aperture 62, ratchet 16 can freely rotate. Further, aperture 62 is sufficiently large in diameter to easily fit around interior end 48 of actuator cap 18 and has sidewalls tapered correspondingly with interior end 48. Preferably, the diameter $D_2$ of ratchet 16 is substantially equal to the diameter $D_1$ of actuator cap 18. Ratchet 16 has a pair of parallel faces, an exteriorly directed face 64 and an interiorly directed face 66.

It has been found suitable to cast the actuator cap, ratchet, and collar in metal with the following specifications: ASTM A-148, grade 105-85.

Pawl 20 is shown in FIG. 8. The pawl is pivotally mounted at 70 to mounting bracket 38. The prong 72 of pawl 20 extends to the valleys 68 between teeth 60 of ratchet 16 so as to impede rotation of ratchet 16 about spindle 12. The pawl can be pivoted to disengage from ratchet 16 and allow free rotation.

The winch assembly according to the present invention is easy to use. To secure an automobile to the transporting vehicle, a chain or another flexible elongated fastener 15 is connected to both the automobile and to the spindle between its first and second ends in the customary manner, such as with a duckbill chain hook, so that the chain can be wound or unwound around the spindle in winch-like fashion. The ratchet 16 is initially loosely and freely rotatable about spindle 12 between actuator cap 18 and collar 34, with pawl 20 engaged between the teeth 60 of ratchet 16. This permits ratchet rotation in one direction only. A tool, such as a tiedown bar (not shown), is inserted through the apertures 44 of actuator cap 18 to rotate and tighten the actuator cap on threaded end 32 of spindle 12 and toward collar 34. Eventually, ratchet 16 is frictionally engaged between actuator cap 18 and collar 34 (FIG. 1), since collar 34 limits movement of the ratchet in the longitudinal direction of spindle 12 toward its remote second end. In this captured position, aperture 62 of ratchet 16 aligns against neck 49 of actuator cap 18, exterior face 64 bears against shoulders 46, and interior face 66 bears against collar 34. While frictionally engaged, actuator cap 18, ratchet 16, and spindle 12 (including affixed collar 34) rotate synchronously as a unit, while the chain is winding around spindle 12. Eventually, the tension exerted on the chain by the friction winch assembly at one end of the chain and the automobile at the other end of the chain is sufficient to maintain the automobile securely on the transporting vehicle.

To loosen the chain so that the automobile may be released, a tiedown bar or other tool is reinserted in actuator cap to rotate it and the spindle in the opposite direction from the tightening direction. While the actuator cap is being loosened, the pawl remains continuously engaged with the ratchet to prevent it from rotating, while the still tightened chain maintains a torque on the spindle and causes the collar to maintain the ratchet in frictional engagement with the actuator cap. The pawl need not be disengaged or otherwise disturbed from the ratchet during this process. Eventually, the chain tension is released sufficiently to cease urging the collar and ratchet against the cap, and the cap, ratchet and collar can be easily separated. The snap ring prevents the actuator cap from completely disengaging from the spindle.

Those who are skilled in the art will readily perceive how to modify the invention. Therefore, the appended claims are to be construed to cover all equivalent structures which fall within the true scope and spirit of the invention.

The invention claimed is:

1. A friction winch assembly for restraining heavy articles on a transporting vehicle, comprising:

a spindle for rotatably mounting on said transporting vehicle, said spindle having a first end and a second end;

flexible elongated means having first and second ends, said first end of said elongated means connected to said spindle and said second end of said elongated means for attachment to said heavy article, said elongated means winding or unwinding around said spindle when said spindle is rotated;

a ratchet loosely and rotatably mounted near said first end of said spindle;

a means fixed to said spindle near said first end of said spindle for limiting movement of said ratchet toward said second end of said spindle;

an actuator cap engaging said first end of said spindle and positioned opposite said ratchet from said limiting means;

means for urging said actuator cap and said ratchet together in frictional engagement so that they rotate synchronously with said spindle; and means for continuously engaging said ratchet along its periphery to resist rotation of said ratchet during the unwinding of said elongated means around said spindle.

2. The friction winch assembly of claim 1 including a bracket wherein said first end of said spindle and said ratchet engaging means are mounted to the bracket adapted to be affixed to said transporting vehicle.

3. The friction winch assembly of claim 1 wherein said ratchet has a tapered aperture, and said actuator cap has a neck portion suitably tapered for alignment with said tapered aperture.

4. The friction winch assembly of claim 1 wherein said limiting means is a collar.

5. The friction winch assembly of claim 1 wherein said actuator cap has a threaded cavity and said first end of said spindle is correspondingly threaded for rotational engagement.

6. The friction winch assembly of claim 1 wherein said actuator cap has at least one aperture for engagement with said means for urging said actuator cap and said ratchet together.

7. The friction winch assembly of claim 1 wherein said means for engaging said ratchet along its periphery is a pawl pivotally mounted to said transporting vehicle.

8. A friction winch assembly for restraining heavy articles on a transporting vehicle, comprising:

a shaft rotatably mounted on said transporting vehicle, said shaft having a longitudinal dimension terminating in first and second ends;

flexible elongated means connected to said shaft between said first and second ends so as to wind or unwind around said shaft when said shaft is rotated;

a ratchet loosely and rotatably mounted on said shaft closer to said first end than to said second end;

an actuator cap engaging said first end of said shaft and opposite said ratchet from said second end;

means fixed to said shaft between said ratchet and said second end for limiting movement of said actuator cap and ratchet along the longitudinal dimension of said shaft;

tool means for urging said actuator cap and said limiting means toward or away from each other, said tool means capable of compressing said actuator cap, said limiting means and said ratchet therebetween with sufficient frictional engagement so that said actuator cap, ratchet and shaft rotate simultaneously as a unit when said elongated means wind about said shaft; and means for peripherally engaging said ratchet to resist rotation of said ratchet when said elongated means unwind about said shaft, said ratchet engaging means remaining in continuous contact with said ratchet until unwinding is completed.

9. The friction winch assembly of claim 8 wherein said shaft comprises a hollow tube section terminating in said second end, and a threaded section affixed to said hollow tube and terminating in said first end.

10. The friction winch assembly of claim 9 wherein said limiting means are affixed to said threaded section.

11. The friction winch assembly of claim 9 wherein said actuator cap has an interior end with a threaded cavity for rotational engagement with said threaded section of said spindle, and a shoulder portion extending around said interior end.

12. The friction winch assembly of claim 11 wherein said interior end of said actuator cap extends longitudinally toward said spindle past said shoulder portion.

13. The friction winch assembly of claim 12 wherein said limiting means is a collar having an aperture of sufficient diameter to extend around said interior end.

14. A winch for applying tension to a flexible elongated means connected to a heavy object, said tension sufficient to pull, lift or secure said heavy object as desired, comprising:

a fixed mounting stand;

a spindle for rotatably mounting on said mounting stand, said spindle having a first end and a second end, said elongated means connected to said spindle and to said heavy object, said elongated means winding or unwinding around said spindle when said spindle is rotated;

a ratchet loosely and rotatably mounted near said first end of said spindle;

a means fixed to said spindle near said first end of said spindle for limiting movement of said ratchet toward said second end of said spindle;

an actuator cap engaging said first end of said spindle and positioned opposite said ratchet from said limiting means, means for urging said actuator cap and said ratchet together in frictional engagement so that they rotate synchronously with said spindle; and means for continuously engaging said ratchet along its periphery to resist rotation of said ratchet during the unwinding of said elongated means around said spindle.

* * * * *